Sept. 10, 1940.     C. J. BROWN     2,213,949
TIRE PRESSURE INDICATOR FOR PNEUMATIC WHEELS
Filed April 8, 1938     2 Sheets-Sheet 1
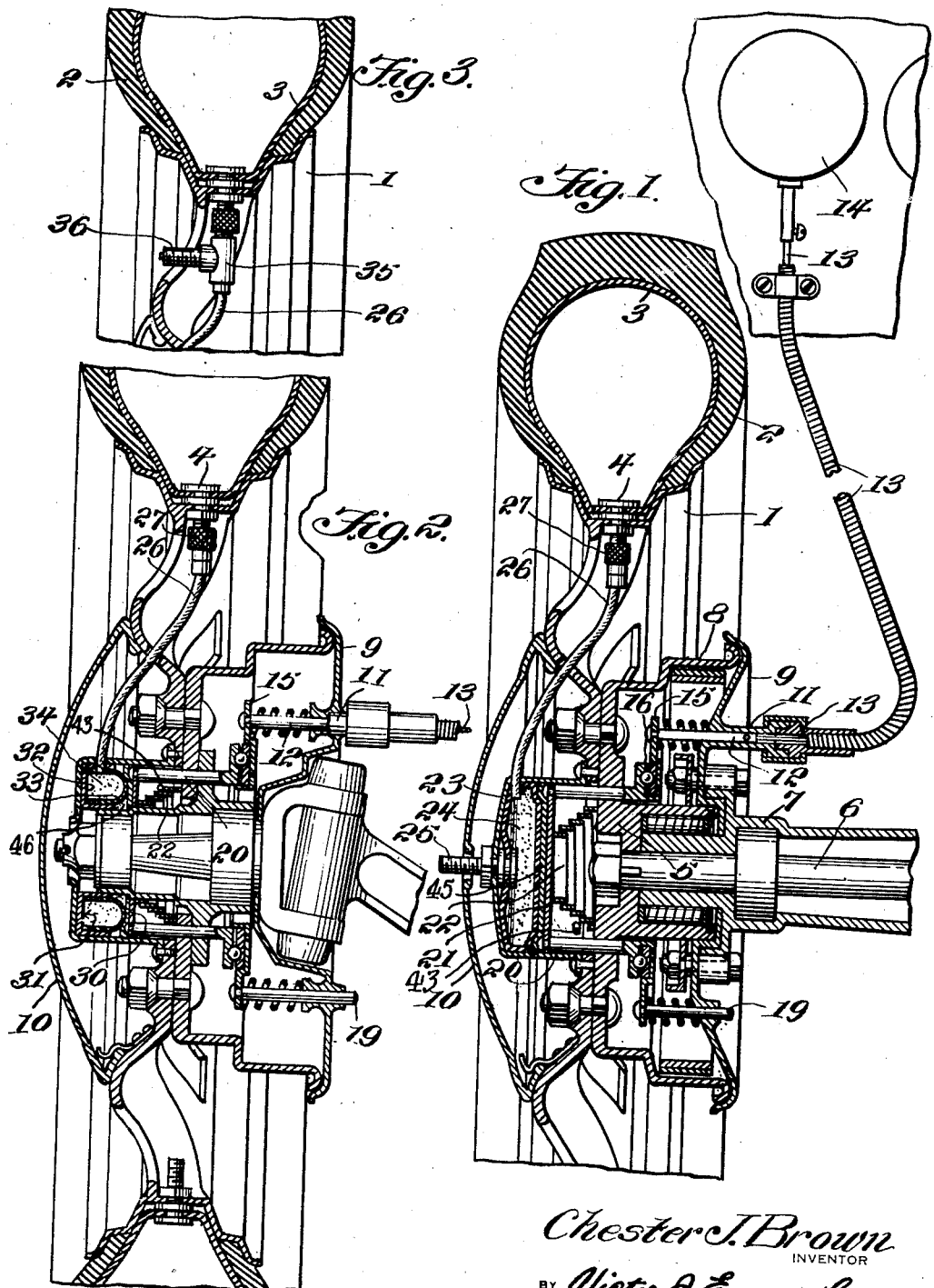
Chester J. Brown
INVENTOR
BY Victor J. Evans & Co.
ATTORNEYS
WITNESS J. L. Wright

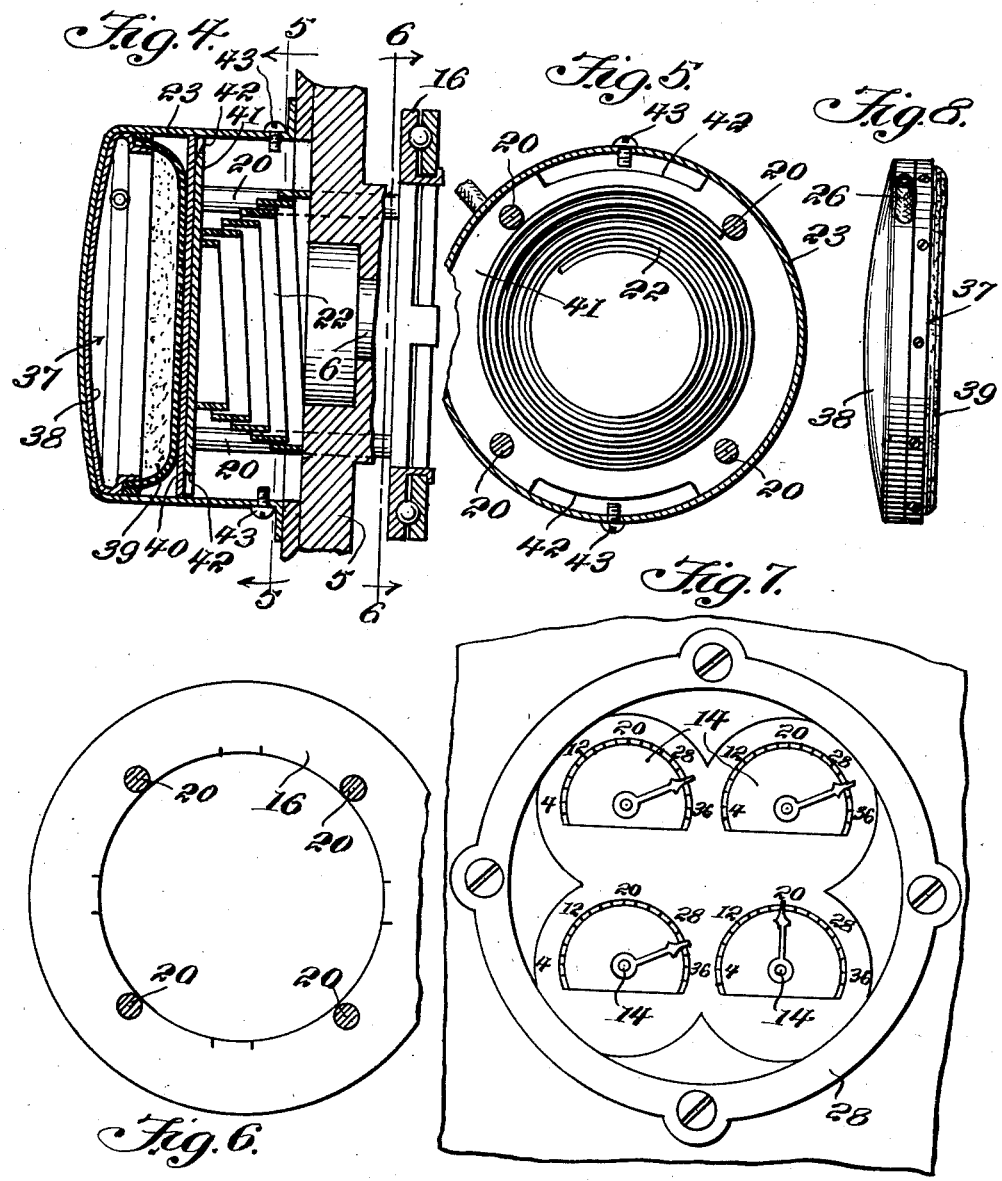

Patented Sept. 10, 1940

2,213,949

UNITED STATES PATENT OFFICE 2,213,949

TIRE PRESSURE INDICATOR FOR PNEUMATIC WHEELS

Chester J. Brown, Garden City, Kans.

Application April 8, 1938, Serial No. 200,994

4 Claims. (Cl. 73—31)

This invention relates to pressure indicators for pneumatic tires of automobiles and has for the primary object the provision of a device of this character which will clearly indicate the approximate number of pounds of air pressure in a tire and may be clearly read by the driver of the automobile from a driving position, which obviates the danger of driving or using the automobile when the tire is over or under inflated.

With these and other objects in view, this invention consists in certain novel features of construction, combination and arrangement of parts to be hereinafter more fully described and claimed.

For a complete understanding of my invention, reference is to be had to the following description and accompanying drawings, in which—

Figure 1 is a fragmentary transverse sectional view showing a portion of a rear wheel and tire of an automobile equipped with my invention.

Figure 2 is a view similar to Figure 1 showing my invention in connection with a front wheel and tire of an automobile.

Figure 3 is a fragmentary transverse sectional view illustrating a modification of my invention which will permit easy inflation of the tire.

Figure 4 is a fragmentary transverse sectional view illustrating another modification of my invention.

Figure 5 is a sectional view taken on line 5—5 of Figure 4.

Figure 6 is a sectional view taken on line 6—6 of Figure 4.

Figure 7 is a front elevation illustrating the indicators for the tires of an automobile wherein they are grouped within a single casing mountable on some part of the automobile such as the instrument board.

Figure 8 is a side elevation illustrating one of the forms of inflatable bags used in connection with the present invention.

Referring in detail to the drawings, the numeral 1 indicates a rear wheel of an automobile, 2 a pneumatic tire for said wheel including the usual inflatable inner tube 3 provided with the conventional inflating valve 4. The wheel 1 is of the demountable type, that is, the wheel structure is detachably secured to the hub 5, the latter being secured to the rear axle 6 and journaled on the axle housing 7. The hub 5 includes the usual brake drum 8 and carried by the axle housing 7 and closing said brake drum is the usual dust shield plate 9. The wheel structure 1 has the usual removable cap 10 for concealing the fasteners employed for detachably mounting the wheel and which provides a space or chamber in which a portion of the present invention is located.

Formed on the dust shield plate 9 is a sleeve 11 slidably supporting a spring pressed plunger 12 connected at one end with a flexible shaft 13 for connecting the plunger to a pressure gage or indicator 14 of any well known construction. The other end of the plunger 12 is connected to a plate 15 forming part of a ball bearing construction 16 which carries pins 20. The bearing construction is slidably mounted on the hub 5 and provides a rotatable connection between the plunger 12 and the pins 20. The plate 15 is further supported by pins 19 which are slidable in the dust plate 9. The pins 20 are slidable in openings in the brake drum to enter the chamber provided by the cap 10. Riveted to the pins 20 is a plate 21 and interposed between said plate and the hub is a spring 22 acting to urge the plate in the direction of the cap 10. A housing 23 is detachably secured on the wheel and has the plate 21 therein as well as portions of the pins 20 and the spring 22. An inflatable bag 24 is located in the housing and is contacted by the plate 21. An inflating valve 25 is connected to the bag and carried by the housing 23. A flexible tube 26 connects the bag to the inflating valve 4 of the inner tube of the pneumatic tire 2. A coupling 27 is employed for detachably connecting the tube to the inflating valve 4 and when adapted to the latter unseats the valve element so as to place the bag in direct communication with the inner tube of the tire. The inner tube of the tire 2 being in direct communication with the bag places an equal air pressure in the bag and inner tube. The air pressure in the bag effects movements of the pins 20 against the action of the spring 22 and through the bearing construction, plunger 12 and flexible shaft causes the indicator 14 to indicate the approximate pounds of air pressure in the tire. It is to be understood that the indicator 14 is located on the instrument board and each wheel and tire of the automobile has devices of the character described adapted thereto with the indicators located on the instrument board and preferably grouped within a suitable mounting 28, as shown in Figure 7. To inflate the tire tube the usual air pressure hose is adapted to the valve 25. An automobile equipped with my invention permits the driver at all times to readily determine the approximate air pressure in the tires from a driving position and should any one of the tires lose air pressure from some cause, the driver will be immediately informed by the indicator of that respective tire so that the automobile may be stopped to prevent further driving of the automobile with the tire under-inflated.

As the construction of the front wheel of an automobile varies from the construction of the rear wheel a slight alteration of parts of the present invention has to be made and by referring to Figure 2 it will be seen that the spring 22 surrounds the hub of the wheel and that a plate 30 is employed in lieu of the plate 21. The plate 30 is apertured to receive the hub. Also shown in Figure 2 is a modified form of inflating bag 31 consisting of a channeled annular rigid member 32 having secured therein a flexible element 33 cooperating with the member 32 in forming an air chamber 34 to the bag. The flexible element 33 bears against the plate 30. The inflatable bag 31 is connected to the inflating valve of the tire as heretofore described in connection with the showing made in Figure 1 and if desired, a different type of fitting may be employed for connecting the flexible tube 26 to the inflating valve of the tire and is indicated by the character 35 in Fig. 3. The fitting 35 holds the inflating valve of the inner tube open and has in conjunction therewith an auxiliary inflating valve 36 to permit inflating of the tire in the usual way.

Referring to my modified form of the invention, as shown in Figures 4, 5, 6 and 8 an inflating bag 37 consists of a rigid cup-shaped member 38 to which a flexible strip 39 is secured and cooperates therewith in forming the air chamber of the bag. The flexible strip 39 lies against a plate 40 and the latter lies against a plate 41 fixedly secured to the pins 20 in the same manner as the pins 20 are connected with the plates 21 and 30 of Figures 1 and 2. Plate 41 is provided with slots 42, and the compression spring 22 is interposed between the plate 41 and the hub 5. I provide the housing 23 with stop pins 43 aligned with the slots 42 and movable therethrough for engagement with the plate 40. Thus the housing 23 may be removed with the demountable wheel and the plate 41 withdrawn therefrom. Under such conditions, stop pins 43 engage the plate 40 to prevent undue expansion of the strip 39 so as to afford protection therefor in the event that the tire is fully inflated. At the same time, plate 41 will hold the spring 22 under compression so as to support the spring in assembled relation with the hub 5. Between the plate 21 and the inflatable bag 24 of Fig. 1, I provide a plate 45 which functionally corresponds to the plate 40 of Fig. 4, with the plate arranged to engage the stop pins 43 to prevent undue expansion of the inflatable bag when the wheel is disconnected from the hub. Plate 21 is slotted in the same manner as the plate 41 to clear the stop pins 43. Similarly, I position a plate 46 between the plate 30 of Fig. 2 and the flexible element 33. Plate 46, with the exception of its washer-like formation, is functionally identical with the plates 40 and 45 of Figs. 1 and 4, respectively, and cooperates with the stop pins 43 in the same manner. Plate 30, which is fixedly connected with the pins 20, is also slotted to clear the stop pins 43 when the wheel is removed from the hub.

What is claimed is:

1. A tire pressure indicator for automotive vehicle wheels including a hub, a brake drum and a dust shield plate therefor, said wheel including a pneumatic tire equipped with an inflating valve, a tubular housing having a closed end and has open end secured to the wheel axially thereof, an inflatable bag in the tubular housing having communication with the pneumatic tire, said bag being located against the closed end of said tubular housing, plate means movable in said tubular housing located against the other side of said bag, a pressure gauge having operating means extending through the dust shield, an operating connection between said plate means and the op operating means slidably extending through said hub, and resilient means interposed between said plate means and the hub.

2. A tire pressure indicator for automotive vehicle wheels including a hub, a brake drum and a dust shield plate therefor, said wheel including a pneumatic tire equipped with an inflating valve, a tubular housing having a closed end and its open end secured to the wheel axially thereof, an inflatable bag in the tubular housing having communication with the pneumatic tire, said bag being located against the closed end of said tubular housing, plate means movable in said tubular housing located against the other side of said bag, a pressure gauge having operating means extending through the dust shield, an operating connection between said plate means and the operating means slidably extending through said hub, and resilient means interposed between said plate means and the hub, said operating connection including relatively rotatably members having bearing means located therebetween.

3. A tire pressure indicator for automotive vehicles including a hub having a demountable wheel, a brake drum and a dust shield plate therefor, said wheel including a pneumatic tire equipped with an inflating valve, a tubular housing having a closed end and its open end secured to the demountable wheel axially thereof, an inflatable bag in the tubular housing having communication with the pneumatic tire, said bag being located against the closed end of the tubular housing, a first and second plate movable in said tubular housing located against the other side of said bag, a compression spring interposed between the first plate and said hub, a pressure gauge having operating means extending through the dust shield, an operating connection between said operating means and said first plate, said operating connection being slidably related to said hub and fixedly connected with the first plate, and means cooperable with said tubular housing and the second plate for holding the latter in assembled relation with the housing when said demountable wheel is removed from the hub, said first plate supporting the compression spring in position against the hub when said tubular housing is withdrawn from the first plate.

4. A tire pressure indicator for automotive vehicles including a hub having a demountable wheel, a brake drum and a dust shield plate therefor, said wheel including a pneumatic tire equipped with an inflating valve, a tubular housing having a closed end and its open end secured to the demountable wheel axially thereof, an inflatable bag in the tubular housing having communication with the pneumatic tire, said bag being located against the closed end of the tubular housing, a first and second plate movable in said tubular housing located against the other side of said bag, a compression spring interposed between the first plate and said hub, a pressure gauge having operating means extending through the dust shield, an operating connection between said operating means and said first plate, said operating connection being slidably related to said hub and fixedly connected with the first plate, and means cooperable with said tubular housing and the second plate for holding the latter in assembled relation with the housing when said demountable wheel is removed from the hub, said first plate supporting the compression spring in position against the hub when said tubular housing is withdrawn from the first plate, said operating connection including relatively rotatable members having bearing means locate therebetween.

CHESTER J. BROWN.